US007328000B2

(12) United States Patent
Juntunen et al.

(10) Patent No.: US 7,328,000 B2
(45) Date of Patent: Feb. 5, 2008

(54) TRANSACTION-BASED SERVICE BILLING IN A TELECOMMUNICATION SYSTEM

(76) Inventors: Ari Juntunen, Sihtikuja 1 D 51, Oulu (FI) FIN-90529; Kimmo Keinänen, Koskitie 28 C 4, Oulu (FI) FIN-90500; Tero Huostila, 2 Clissold Road, London (GB) N16 9EU ( * ) Notice: Subject to any disclaimer, the term of this patent is extended or adjusted under 35 U.S.C. 154(b) by 1025 days.

(21) Appl. No.: 10/243,334

(22) Filed: Sep. 13, 2002

(65) Prior Publication Data

US 2004/0002324 A1 Jan. 1, 2004

(30) Foreign Application Priority Data

Mar. 14, 2000 (FI) .................................. 20000589
Mar. 13, 2001 (WO) ...................... PCT/FI01/00244

(51) Int. Cl.
*H04M 11/00* (2006.01)
(52) U.S. Cl. ....................................................... 455/406
(58) Field of Classification Search ................ 455/406
See application file for complete search history.

(56) References Cited

U.S. PATENT DOCUMENTS

| 5,943,320 | A | 8/1999 | Weik et al. | |
| 6,822,954 | B2 * | 11/2004 | McConnell et al. | 370/352 |
| 7,020,479 | B2 * | 3/2006 | Martschitsch | 455/466 |
| 2002/0163938 | A1 * | 11/2002 | Tuomainen et al. | 370/468 |
| 2003/0074286 | A1 * | 4/2003 | Rodrigo | 705/32 |
| 2004/0249935 | A1 * | 12/2004 | Jackson et al. | 709/224 |

FOREIGN PATENT DOCUMENTS

| GB | 2 332 337 | 6/1999 |
| JP | 10-117215 | 5/1998 |
| WO | WO99/21350 | 4/1999 |
| WO | WO99/29065 | 6/1999 |
| WO | WO99/33034 | 7/1999 |
| WO | WO99/45684 | 9/1999 |
| WO | WO 00/46963 | 8/2000 |

OTHER PUBLICATIONS

Denis Murphy, "The Mobile Economy Becomes a Reality", Nov. 1999, Telcommagazine.*
Murphy, Dennis "The Mobile Economy Becomes a Reality", Nov. 1999, Telecommagazine.

* cited by examiner

*Primary Examiner*—Barry Taylor
(74) *Attorney, Agent, or Firm*—Berkeley Law & Technology Group, LLP

(57) ABSTRACT

A WAP Charging Gateway, and a method and system, for arranging transaction-based billing for WAP services in a telecommunication system that includes a telecommunication network, a terminal device connected to the telecommunication network and used for accessing WAP services, a WAP Gateway connected to the telecommunication network, a content provider of WAP services connected to the WAP Gateway, a billing log file, a transaction manager for recording transactions associated with billable services and generated from different WAP protocol levels in the billing log file, and reading devices for reading the billing log file. Transactions associated with billable services, generated from different WAP protocol levels, are written to the billing log file and are read from the billing log file (LOG). The transactions in the billing log file are converted into a readable form. First rules are applied to the converted transactions to generate and store predefined transaction parameters, and second rules are then applied to the stored transaction parameters for generating chargeable transactions therefrom.

18 Claims, 3 Drawing Sheets

TRANSACTION-BASED SERVICE BILLING IN A TELECOMMUNICATION SYSTEM

BACKGROUND OF THE INVENTION

1. Field of the Invention

The present invention relates to telecommunication systems. In particular, the invention is directed to a method, system and WAP Charging Gateway for implementing transaction-based billing for WAP services.

2. Description of the Related Art

Usage of the wireless application protocol (WAP) is becoming increasingly common in the implementing of applications and services that require a communication connection between portable terminal devices, such as mobile stations, and Internet applications and content such for example as electronic mail, the World Wide Web (WWW) and newsgroups. The wireless application protocol provides an architecture that adapts mobile phones, browser programs of mobile phones, and the WWW to work together as a functional entity. The HTML (HyperText Mark-up Language) used in the WWW is translated, when information is being transmitted to mobile stations, into a standardized Wireless Mark-up Language (WML) that has been developed for the wireless environment. Although at present the WML language is typically employed as the descriptive language of the WAP standard, it should be understood that any other description language consistent with current or future WAP standards may alternatively be used. In any event, the wireless application protocol comprises five layers: the wireless application environment (WAE), the wireless session layer (WSL), the wireless. transaction layer (WTP), the wireless transport layer security (WTLS), and the wireless datagram layer (WDP). As used herein, the wireless application environment is intended to denote, by way of example, a Wireless Telephone Application (WTA) or other suitable environment. Below the five layers of the wireless application protocol is a system dependant layer that defines the transfer mode of the information within the system in question. The currently accepted specification is WAP specification 1.1; this and other WAP-related specifications can be viewed at the WWW site associated with "wapforum.com".

The undeniable advantage of a mobile communication network, as for example a GSM (Global System for Mobile communications) system, as compared with a public switched telephone network (PSTN) is mobility management. The mobile communication network allows a subscribing user to make and receive phone calls anywhere within the coverage area of the network. In this application, the mobile communication network is defined, by way of preferred but nonetheless illustrative example, as a digital mobile network.

In 1997, the companies Ericsson, Motorola, Nokia and Phone.com founded the WAP Forum which is an open association of terminal manufactures, operators and different service providers that anyone can join. One specific objective of the WAP architecture is to enable the use of services provided via the Internet on portable terminals whose data processing capabilities, size of display and/or storage capacity is relatively small or restricted. Such terminals may for example take the form of mobile stations and PDAs (Personal Digital Assistants). The WAP specification does not require that the air or wireless interface be implemented in any particular manner, thus permitting different operators to take advantage of a wide variety of possibilities that the standard accommodates.

At present, use of the WAP protocol in mobile stations may be effected, for example, by means of SMS (Short Message Service) short messages or via a separate switched data connection in which a connection is established by the mobile station with a specific accessible number that offers data services.

The billing of WAP services is currently implemented by invoicing the client based on the actual connection time used by the switched data connection. If the transmission of WAP protocol messages is effected using short messages, then one SMS-based WAP transaction may by way of illustration require five MO (Mobile Originated) oriented and fifteen MT (Mobile Terminated) oriented short messages.

The problem with connection time-based billing is the increased difficulty of distributing the resulting income—i.e. the fair or equitable or appropriate distribution of billed income between the service provider and the content provider. In connection time billing, all of the available services are provided to a user at the same cost. Connection time-based income therefore cannot be equitably divided between the service provider and content providers. A similar problem occurs with SMS-based WAP services; the number of messages used in providing a WAP-based service is typically unrelated to the value of the content or the quality of the particular service.

OBJECTS AND SUMMARY OF THE INVENTION

It is accordingly the desideratum of the present invention to eliminate, or at least significantly alleviate, the drawbacks and deficiencies of prior art systems and methods, such for example as those discussed hereinabove.

It is a particular object of the invention to provide a new and improved method, system and device for the implementation of transaction-based billing for WAP services.

The present invention more generally relates to and is presented in the context of telecommunication systems. The invention enables the pricing of service traffic implemented in accordance with the WAP specification and carried out by or through a WAP Gateway on a transaction-defined basis.

The invention is in one specific aspect directed to a WAP Charging Gateway for implementing transaction-based billing for WAP services. The WAP Charging Gateway of the invention includes reading devices for reading the billing log file, conversion facilities for converting the billing log file transaction data into a readable form, first rules identifying and storing predefined transaction parameters based on the transaction data read from the billing log file, and second rules for use in generating chargeable transactions from the aforementioned stored transaction parameters generated through application of the first rules.

In some embodiments of the invention, the WAP Charging Gateway additionally includes a transmitter for sending items of billing information to a billing system.

The present invention is also directed to a method for implementing transaction-based billing for WAP services. In accordance with the inventive method, transactions (i.e. transaction data) associated with billing and generated from different WAP protocol levels are written or recorded in the billing log file; this recording of the transaction data is advantageously carried out in the WAP Gateway, and the billing log file is advantageously read in the WAP Charging Gateway.

Also in accordance with the invention, the transactions data in the billing log file are converted into a readable form, preferably in the WAP Charging Gateway. Predetermined first rules are then applied in the WAP Charging Gateway to the converted transactions data to generate and store predefined transaction parameters. One such parameter may for example be the URL (Universal Resource Locator) address of the chargeable service. Chargeable transactions are then generated from these stored parameters based on predetermined second rules.

The content of the second rules may depend on where the WAP protocol messages are being transported, and is used to determine or identify those events which form or constitute a chargeable transaction. The content of the second rules depends on whether the WAP service has been implemented by means of short messages or by means of a data call connection, and further depends on Whether the connection is connection-oriented (i.e. wired) or connectionless (i.e. wireless).

In some embodiments of the invention, various error situations or status data of the service are taken into account when generating the rules.

Also in some embodiments of the invention, information connected with the same transaction is combined based on a specific identifier—a so-called Event_Linkage_Id—into a separate billing ticket. The billing ticket so generated may be further transmitted or transferred for handling by the billing system.

The present invention is still additionally directed to transaction-based billing for WAP services in a telecommunication system that includes a telecommunication network, a terminal device connected to the telecommunication network and which is employed to access or utilize the WAP services, a WAP Gateway connected to the telecommunication network, a content provider of WAP services which is connected to the WAP Gateway, and a billing log file. The telecommunication network may advantageously be a mobile communication network and the terminal device a mobile station. The telecommunication system further includes a transaction manager for writing transaction records or data associated with billing and generated from different WAP protocol levels into the billing log file, and reading devices for reading the billing log file. In addition, the inventive system includes a WAP Charging Gateway that comprises conversion facilities for converting the transaction data included in the billing log file into a readable form, first rules for application against the converted transaction data to generate and store predefined transaction parameters, and second rules for application against the stored transaction parameters for generating chargeable transactions therefrom.

The telecommunication system, in some embodiments of the invention, further includes a billing management system for handling the billing ticket that is generated.

Also in some embodiments of the invention, the system includes a transmitter for sending items of billing information to a separate billing system.

The present invention enables the offering of WAP services at different costs or pricing to users, accurate reports concerning the use of such services, and flexible distribution of income to the content provider as a function of the amount of use of the service or content. The distribution of income to the content provider for a particular service based on the concept of payment for transactions may thus be implemented based on actual use of the service. Whereas in the past content has generally been purchased from content providers only with permanent contracts, the present invention advantageously provides for the equitable distribution of income to content providers, even in unusually complex contracts that include both fixed prices and prices based on individual transactions. The management of WAP transactions in accordance with the invention additionally enables advanced consideration of QoS (Quality of Service) aspects of transactions, both in the price of the service to the end user or customer and in the distribution of income.

The present invention is furthermore advantageously independent both of the transmission path of the WAP services (as for example via SMS or a data call) and of the connection mode (i.e. wired or wireless).

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the various Figures.

DETAILED DESCRIPTION OF THE CURRENTLY PREFERRED EMBODIMENTS

Figure 1:
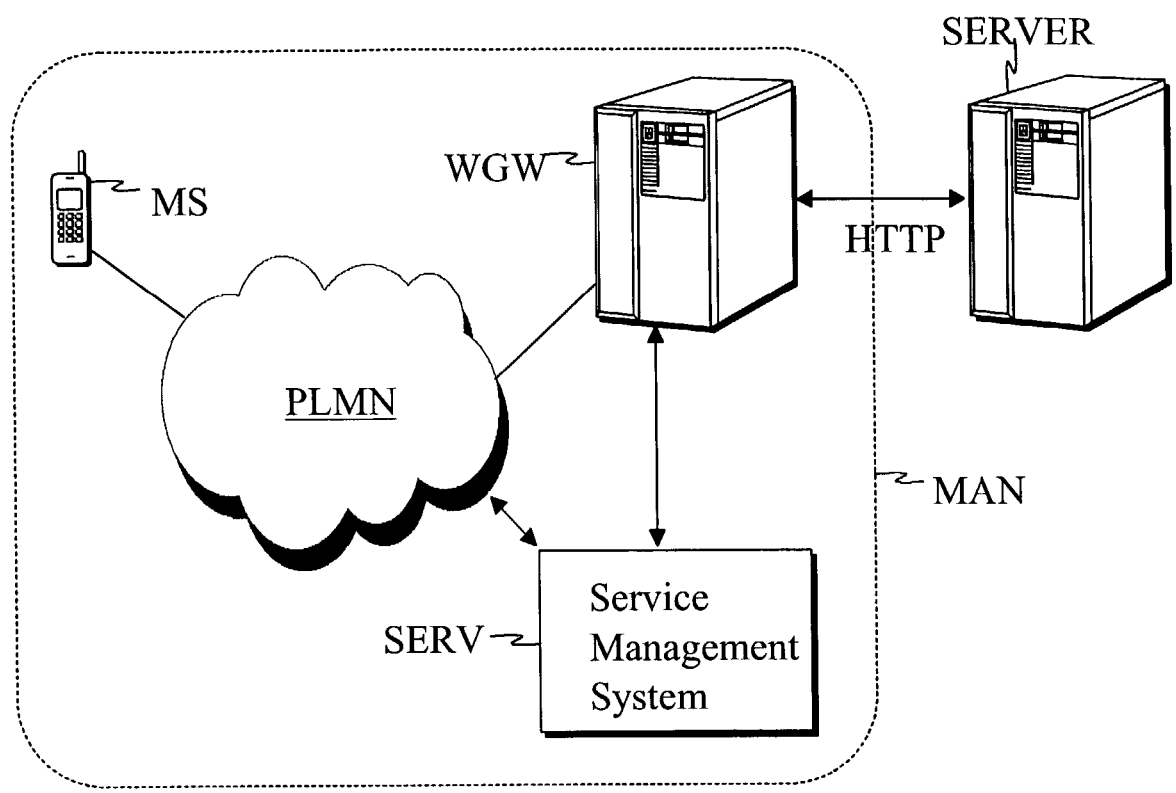
FIG. 1 is a block diagram of a system in accordance with the present invention utilizing the wireless access protocol (WAP)

FIG. 1 depicts, by way of illustrative example, the architecture of a system operatively utilizing the wireless application protocol in accordance with the present invention. The illustrated system includes a telecommunication network PLMN, a mobile station MS connected to the network PLMN, a WAP Gateway WGW connected to the network, and a service management system SERV also connected to the network. The system additionally includes a content provider SERVER. The WAP Gateway WGW is operable for converting or transforming or otherwise changing the material provided by the content provider SERVER into a form suitable for the mobile station MS and for transmitting or transferring the transformed information to the mobile station. The traffic between the WAP Gateway WGW and the content provider SERVER is in this example consistent with the HTTP (Hyper Text Transport Protocol) protocol. The area MAN within the dotted-line border is owned by or under the control of a mobile operator. Using the service management system SERV a variety of statistical information relating to the WAP services can be generated, controlled and managed.

Figure 2:
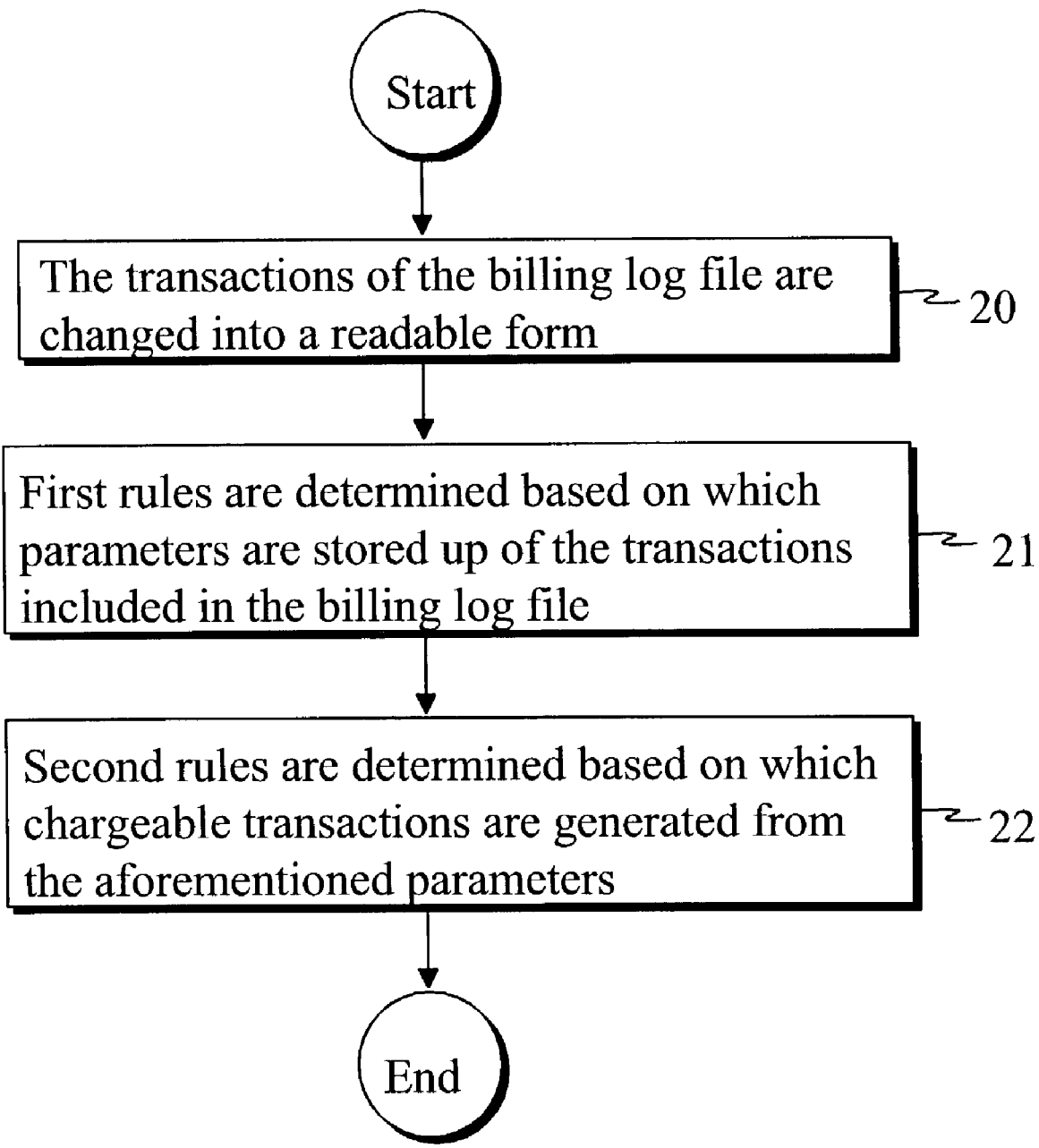
FIG. 2 is a flow chart of a method in accordance with the invention.

The flow chart of FIG. 2 shows the operative functionality of the present invention. The WAP Gateway transmitting WAP services is so configured that billing transaction data generated from different WAP protocol levels is written to the billing log file. Thus, in providing a requested service to a user a series of transactions are carried out, and each such transaction is recorded in the billing log file. The WAP Charging Gateway reads the billing log file and converts the stored transaction data in the billing log file into a readable form (block 20).

The WAP Charging Gateway includes first rules. The application of those first rules (block 21) to the transaction data read from the billing log file results in the storing of various predefined parameters. One such parameter may for example be the URL address of the chargeable service; the identification of a service as chargeable is thus based on the URL address at which, for example, the service is accessed or requested. As indicated at block 22, second rules are then applied against the stored parameters, on the basis of which chargeable parameters are generated from which appropriate billing for the service can be determined.

Figure 3:
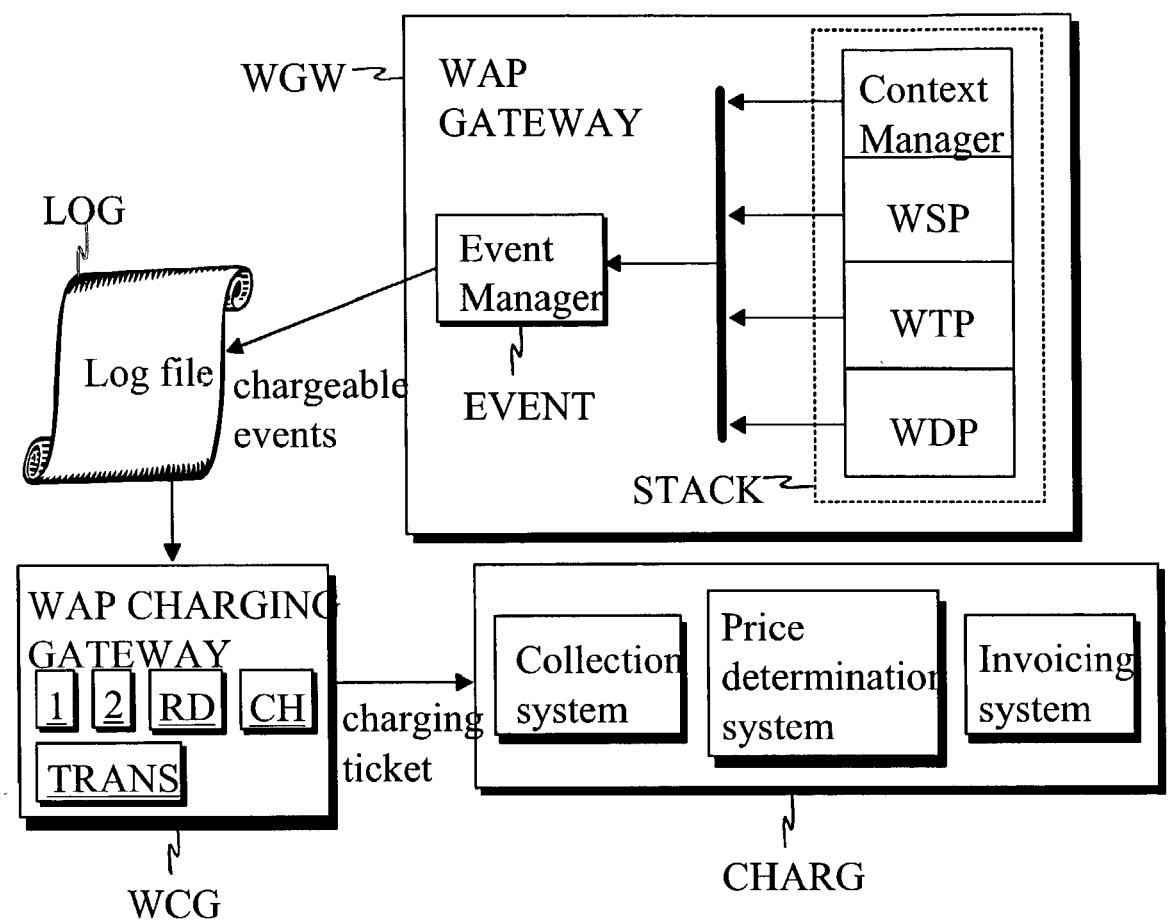
FIG. 3 is a block diagram of a system implementing the present invention.

The system shown by way of further illustrative example in FIG. 3 includes a WAP Gateway WGW, a billing log file LOG, a WAP Charging Gateway WCG, and a separate billing management system CHARG.

In the system depicted in FIG. 3 and herein described the WAP Gateway WGW is a server computer that includes an event manager EVENT and a WAP protocol STACK. Those skilled in the art will appreciate that only those features of the server computer WGW that are relevant to the present invention and this disclosure are presented in FIG. 3; thus, the WAP Gateway may additionally include or comprise other elements and/or software components that are not necessary or relevant to this disclosure and the present invention. By virtue of the operation and functioning of particular WAP services that are requested by mobile station MS, the protocols consistent with the protocol stack STACK may produce different transaction data. The event manager EVENT collects the transaction data associated with billing requirements and writes the transaction data to a separate billing log file LOG. The billing log file LOG may be a part of the WAP Gateway WGW or, alternatively, of the WAP Charging Gateway WCG.

The WAP Charging Gateway WCG includes reading devices RD for reading the billing log file LOG and conversion or changing facilities CH for converting or transforming the transaction data in the billing log file into a readable form.

Thus, the WAP Charging Gateway WCG reads the billing log file LOG and converts the included transaction data into a readable form. Two sets of rules are then applied in the WAP Charging Gateway WCG. The responsibility of the first set of rules 1 is to generate, from the converted transaction data from the billing log file, certain predefined parameters to be stored. The second set of rules 2 is then applied to those stored parameters for generating chargeable transactions from those stored parameters.

The content of the second set of rules 2 depends on where the WAP protocol messages are being transported, i.e. based on whether the WAP service has been implemented by means of short messages or by means of a data call connection. The content of the second set of rules 2 further depends on whether the transmission is via a wired or wireless connection or transmission path. The rules additionally take into account different error situations or status data of the service. As should be apparent, only those features of the WAP Charging Gateway WCG relevant to the operation and implementation of the invention have been presented, and additional features and software components not related or relevant to the invention may also be included in the WAP Charging Gateway.

The following table presents chargeable transaction parameters in the WAP Gateway WGW:

| | |
|---|---|
| WDP_PRIM_TXD_UP_STACK SUCCESS | The WDP layer successfully transmitted a TdunitData.Ind primitive to an upper protocol layer. |
| CM_HTTP_RQ | The Context Manager has made a HTTP Request: |
| CM_HTTP_RESP | The Context Manager has received a response from the network. |
| WDP_DATAGRAM_TXD_BEARER_FAIL | The WDP failed in sending the datagram into the network. |
| CM_ENCODING_FAILED | The translator failed in translating the WMLScript into a binary form. |
| CM_REQUEST_FAILED | A general transaction which denotes the failure of a request. |
| CM_WSP_PRIMITIVE_GEN | The Context Manager has generated a WSP service primitive. |
| WDP_DATAGRAM_TXD_BEARER | The WDP successfully transmitted the datagram into the network. |

The following table indicates, for the transaction parameters, the corresponding attributes of a billing ticket to be generated. As indicated, information is not collected for all chargeable transactions, but their occurrence is nevertheless recorded.

| Attribute of the Ticket | Transaction WDP_PRIM_TXD_UP_STACK_SUCCESS | CM_HTTP_RESP | WDP_DATAGRAM_TXD_BEARER_FAIL | CM_REQUEST_FAILED | CM_WSP_PRIMITIVE_GEN | WDP_DATAGRAM_TXD_BEA |
|---|---|---|---|---|---|---|
| EVENT_LINK AGE_ID | elid | | | | | |
| BATCH_SEQUENCE | | | | | | |
| USER_MSISDN | | msisdn | | | Msisdn | |
| USER_IMSI | | | | | | |
| SERVICE_ADDRESS | destination_address | | | | | |
| SERVICE_STATUS | OK | OK/Fail | Fail | Fail | | |
| CONTENT_ADDRESS | | URL1 | | | URL | |
| SERVICE_START_TIME | Time | | | | | |
| SERVICE_END_TIME | | | Time | Time | | Time |
| MESSAGES_SENT | | | | | | SMS |

-continued

| Attribute of the Ticket | Transaction WDP_PRIM_TXD_UP_STACK_SUCCESS | CM_HTTP_RESP | WDP_DATAGRAM_TXD_BEARER_FAIL | CM_REQUEST_FAILED | CM_WSP_PRIMITIVE_GEN | WDP_DATAGRAM_TXD_BEA |
|---|---|---|---|---|---|---|
| MESSAGES_RECEIVED | SMS | | | | | |
| BYTES_SENT | | | | | content_length | |
| BYTES_RECEIVED | content_length | | | | | |
| TICKET_COMPLETE | | | x | X | x | x |
| EVENT_MASK | x | x | x | X | x | x |

In a typical successful WAP service transaction when using a connectionless (i.e. wireless) connection, the following transactions are typically recorded in the log file:
   WDP_PRIM_TXD_UP_STACK_SUCCESS (The WDP level of the WAP Gateway acknowledges receipt of the service request from the WAP terminal device)
   CM_HTTP_RQ (The Context Manager of the WAP Gateway sends an HTTP request to the server)
   CM_HTTP_RESP (The Context manager receives an HTTP response to the service request)
   CM_WSP_PRIMITIVE_GEN (The HTTP response has been changed to the WSP level of the WAP protocol)
   WDP_DATAGRAM_TXD_BEARER (The WDP level has successfully sent a response along the transmission path.)
In a connection-oriented (i.e. wired) connection, the first transaction is omitted; the first transaction has a different Event_Linkage_Id than the other transactions:
   CM_HTTP RQ
   CM_HTTP_RESP
   CM_WSP_PRIMITIVE_GEN
   WDP_DATAGRAM_TXD_BEARER
The WAP Charging Gateway WCG generates a billing ticket each time that there are new transactions to handle, with the elid (EVENT_LINKAGE_ID) attribute value indicating there are no open billing tickets to be found (TICKET_COMPLETE=0). For an open billing ticket, there are still new transactions to be expected.

The following table shows a list of the update rules for the ticket attributes:

| | |
|---|---|
| USER_MSISDN | If this attribute of the ticket has a value, then nothing is done. If there is no value, then it is taken from the MSISDN field of the transaction if the field can be found. |
| SERVICE_ADDRESS | If this attribute of the ticket has a value, then nothing is done Otherwise, if the transaction data was WDP_PRIM_TXD_UP_STACK_SUCCESS, the value is taken from the DESTINATION_ADDRESS parameter. |
| SERVICE_STATUS | This value is taken from the STATUS parameter. |
| CONTENT_ADDRESS | If this attribute of the ticket has a value, then nothing is done Otherwise the value is taken from the URL parameter of the value, if it exists. |
| SERVICE_START_TIME | If this attribute of the ticket has a value, then nothing is done. Otherwise the value is taken from the TIME parameter of the value, if it exists. |

-continued

| | |
|---|---|
| | The value of the attribute SERVICE_START_TIME of the ticket will be the time stamp of the first transaction of the ticket. This is not necessarily relevant to when the service, from the point of view of the service user, began. |
| SERVICE_END_TIME | The value of this attribute is updated with the value of the TIME parameter of each ticket to be handled. The outcome is that the value of the attribute_END_TIME of the ticket will remain the time stamp of the last transaction of the ticket. |
| MESSAGES_SENT | This value is taken from the SMS parameter of the WDP_DATAGRAM_TXD_BEARER transaction. |
| MESSAGES_RECEIVED | This value is taken from the SMS parameter of the WDP_PRIM_TXD UP_STACK_SUCCESS transaction. |
| BYTES_SENT | This value is taken from the CONTENT_LENGTH parameter of the CM_WSP_PRIMITIVE_GEN transaction. |
| BYTES_RECEIVED | This value is taken from the CONTENT_LENGTH parameter of the WDP_PRIM_TXD_UP_STACK_SUCCESS transaction. |
| EVENT_MASK | In this attribute, a record is kept of what transactions have already been handled for this ticket. The value of the attribute is updated on each transaction, but the value depends not on the parameters of the transaction but solely on the ID of the transaction. |

The ticket is completed when its SERVICE_END_TIME is older than the time stamp of the transaction last read in the billing log file LOG of the WAP Gateway WGW and, in addition, when the transactions CM_WSP_PRIMITIVE_GEN and WDP_DATAGRAM_TXD_BEARER or WDP_DATAGRAM_TXD_BEARER or CM_REQUEST_FAILED can be found in the ticket. The WAP Charging Gateway WCG includes in some embodiments a transmitter TRANS for sending the items of billing information to a separate billing system; the transmitter TRANS is also used for transferring completed billing tickets to the billing management system CHARG in which the amount of the invoice is determined and from which the user is charged for the service obtained or employed by the user. The billing ticket that is generated describes the WAP service operations in such a way that, based on the billing ticket, client billing and the distribution of income may be carried out.

It is generally contemplated and anticipated, as will be apparent to those skilled in the relevant arts, that the functionality of the WAP charging gateway—inter alia for reading of the transaction data from the billing log file, for defining and applying the first and second rules or rule sets, and for generating and storing the transaction parameters and chargeable transactions information or data—be implemented in software. The particular computer code utilized to provide this functionality can take any suitable form and can readily be prepared by a skilled software programmer with a knowledge of this disclosure. It is nevertheless also within the intended scope of the invention that any one or more of the functions of the inventive WAP charging gateway may alternatively be implemented by shared or dedicated hardware or by a combination of such hardware and software as a general matter of design choice.

While there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A WAP charging gateway for providing transaction-based billing for WAP services from transaction data written to a billing log file in connection with provision of billable WAP services to a user, said gateway comprising:
    a storage element for storing the billing log file including the transaction data;
    a converter for converting the transaction data from the billing log file into an alternate readable form;
    first rules applicable to the converted transaction data for generating and storing defined transaction parameters based, at least in part, on the converted transaction data; and
    second rules applicable to the stored transaction parameters for generating, from the stored transaction parameters, chargeable transactions for use in preparing transaction-based bills for the WAP services.

2. The WAP charging gateway in accordance with claim 1, further comprising
    a transmitter for sending billing information from the WAP charging gateway to a billing system.

3. A method for providing transaction-based billing for WAP services, comprising:
    writing transaction data generated from different WAP protocol levels and associated with billable WAP services to a billing log file;
    reading the written transaction data from the billing log file;
    converting the transaction data from the billing log file into an alternate readable form;
    applying first rules to the converted transaction data to generate and store defined transaction parameters based, at least in part, on the converted transaction data; and
    applying second rules to the stored transaction parameters to generate chargeable transactions for use in preparing transaction-based bills for the WAP services.

4. The method of claim 3, wherein the billing log file to which the generated transaction data is written is included in a WAP gateway.

5. The method of claim 3, wherein said reading the written transaction data from the billing log file is carried out in a WAP charging gateway.

6. The method of claim 4, wherein said reading the written transaction data from the billing log file in the WAP gateway is carried out in a WAP charging gateway.

7. The method of claim 3, wherein the second rules are defined based, at least in part, on where WAP protocol messages are being transported.

8. The method of claim 3, wherein the second rules are defined based, at least in part, on whether communications are effected via a wired connection or a wireless connection.

9. The method of claim 3, wherein at least one of the first and second rules is defined based, at least in part, on at least one of an error situation and service status data.

10. The method of claim 3, further comprising combining information relating to a single transaction into a separate billing ticket based, at least in part, on a specific identifier.

11. The method of claim 3, further comprising generating a billing ticket and sending the generated billing ticket to a billing system.

12. The method of claim 11, further comprising combining information relating to a single transaction into a separate billing ticket based, at least in part, on a specific identifier.

13. A system for providing transaction-based billing for WAP services in a telecommunication system that includes a telecommunication network, a terminal device connected to the telecommunication network and operable for using WAP services, a WAP gateway connected to the telecommunication network, a content provider of WAP services connected to the telecommunication network, a billing log file, an event manager operable for writing to the billing log file transaction data generated from different WAP protocol levels and associated with billable transactions, and a reading device for reading the transaction data from the billing log file, said transaction-based billing system comprising:
    a WAP charging gateway;
    a converter in said WAP charging gateway for converting the transaction data in the billing log file into a readable form;
    first rules for application in said WAP charging gateway to the converted transaction data for generating and storing defined transaction parameters based, at least in part, on the converted transaction data; and
    second rules for application in said WAP charging gateway the stored transaction parameters for generating, from the stored transaction parameters, chargeable transactions for use in preparing transaction-based bills for the WAP services.

14. The system in accordance with claim 13, further comprising a billing management system for handling generated billing tickets.

15. The system in accordance with claim 13, further comprising a transmitter for sending billing information to a billing system.

16. The system in accordance with claim 14, further comprising a transmitter for sending billing information to the billing management system.

17. The system in accordance with claim 13, wherein the telecommunication network comprises a mobile communication network.

18. The system in accordance with claim 13, wherein the terminal device comprises a mobile station.

* * * * *

UNITED STATES PATENT AND TRADEMARK OFFICE
CERTIFICATE OF CORRECTION

PATENT NO. : 7,328,000 B2
APPLICATION NO. : 10/243334
DATED : February 5, 2008
INVENTOR(S) : Ari Juntunen Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1425 days.

Signed and Sealed this
Fifteenth Day of February, 2011

David J. Kappos
*Director of the United States Patent and Trademark Office*